(12) United States Patent
Hubbard et al.

(10) Patent No.: US 6,746,185 B2
(45) Date of Patent: Jun. 8, 2004

(54) NOZZLE FOR LUBRICATING A WORKPIECE

(75) Inventors: Kevin Hubbard, Glen Carbon, IL (US); Richard N. Callahan, Springfield, MO (US)

(73) Assignee: University of Missouri Board of Curators, Columbia, MO (US)

( * ) Notice: Subject to any disclaimer, the term of this patent is extended or adjusted under 35 U.S.C. 154(b) by 106 days.

(21) Appl. No.: 10/038,180

(22) Filed: Jan. 2, 2002

(65) Prior Publication Data

US 2003/0123940 A1 Jul. 3, 2003

(51) Int. Cl.$^7$ ............................................... B23B 35/00
(52) U.S. Cl. ..................... 408/1 R; 408/56; 408/61; 239/8; 239/418
(58) Field of Search ..................... 408/1 R, 56, 61; 239/8, 418, 419, 422

(56) References Cited

U.S. PATENT DOCUMENTS

| | | | |
|---|---|---|---|
| 1,492,593 A | * 5/1924 | Day | 239/8 |
| 3,570,332 A | * 3/1971 | Beake | 408/61 |
| 5,174,692 A | * 12/1992 | Martin | 408/56 |
| 5,635,165 A | * 6/1997 | Panitch | 424/65 |
| 6,161,778 A | * 12/2000 | Haruch | 239/290 |

OTHER PUBLICATIONS

Basu, Hemendra N.; Robley, Ellen M., and Norris, Max E., "Preparation of Glycol Derivatives of Partially Hydrogenated Soybean Oil Fatty Acids and Their Potential as Lubricants," JAOCS 71, No. 4 (1994) pp. 1227–1230.

Modern Application News, "JPL Clears The Air For Precision Machining," 32, No. 3, (Mar. 1998), pp. 20–21.

\* cited by examiner

Primary Examiner—Daniel W. Howell
(74) Attorney, Agent, or Firm—Lathrop & Gage L.C.

(57) ABSTRACT

The present invention relates to a nozzle for use in a metalworking process, whereby the nozzle is designed to precisely deliver an oil-containing liquid and non-flammable gas mixture onto the interface between a metalworking tool and a workpiece, whereby the nozzle is comprised of a tip and a valve body affixed to one another. Furthermore, the present invention relates to a method for cooling and lubricating a tool and workpiece during a metalworking process.

31 Claims, 4 Drawing Sheets

NOZZLE FOR LUBRICATING A WORKPIECE

BACKGROUND OF THE INVENTION

The present invention relates to a nozzle device for delivering a metalworking fluid to a precise location on a workpiece being metal worked, with the metalworking fluid comprising an amount of at least one oil-containing liquid and an amount of a non-flammable gas. The present invention further relates to a method for delivering such metalworking fluid in an amount sufficient to cool and lubricate the workpiece, while minimizing the amount of oil-containing liquid required.

It has been known for decades that metal, including aluminum, steel, and other types of ferrous and non-ferrous metals used for forming machines or parts, can be metal worked using various types of metalworking tools. More particularly, a metal workpiece is a piece of metal that can be metal worked to form a part or member. When a workpiece is metal worked without the benefit of a coolant or lubricant, the metalworking tool has a reduced work life. A shortened tool life increases the cost of metalworking. Also, without lubrication and cooling of the workpiece, metalworking a workpiece typically requires a longer cycle time. To reduce friction, extend the tool life, and reduce the time for metalworking, it has been known to use lubricants and/or cooling liquids to lubricate and/or cool the workpiece and the metalworking tool. Addition of these liquids extends the tool life and results in a more efficient metalworking process, i.e. improved surface texture of the metal worked product and increased metalworking process speeds and feeds. It is in the use and disposal of these metalworking fluids that problems are encountered and costs incurred rather than avoided. Typical problems lie in the areas of application methods, worker exposure, waste disposal, foaming, and the requirement for secondary workpiece cleaning operations.

Currently, various types of metalworking fluids are applied to workpieces, with the metalworking fluids designed to serve a variety of functions. Such functions include, but are not limited to, removal of heat from the workpiece and tool (cooling), reduction of friction among chips, tool and workpiece (lubrication), and removal of metal debris produced by the metalworking operation. The metalworking fluids are more particularly intended to act at the interface between the tool and workpiece.

Common metalworking fluids fall into two broad categories: oil-based and water-based fluids. Oils are typically used as lubricants, often at cutting speeds below 400 sfpm. Oil-based lubricants can be further classified as natural oils, synthetic oils, and semi-synthetic oils. These fluids tend to provide excellent lubricity and exhibit very good extreme pressure (EP) properties, but do not generally act as efficient heat transfer media. Water-based fluids are typically used as coolants, usually at cutting speeds above 400 sfpm. These fluids carry thermal energy from the tool/work interface very efficiently, and can be tailored to a specific application easily with the addition of additives which improve lubricity, inhibit rust, retard bacteria growth, and improve EP performance. Water-based fluids, however, tend to be inferior to oil-based fluids in terms of lubricity. Emulsions and water-soluble oils are sometimes used in an attempt to combine the most attractive properties of both oil-based and water-based metalworking fluids.

The metalworking fluid, regardless of specific type, is applied typically by either a flood application, a spray application, or a mist application. In flood application, a high volume liquid stream is directed into the metalworking zone. The high volumetric flow rate of this stream is a primary mechanism by which chips and thermal energy are carried away from the tool/workpiece/chip interfaces. The removal of hot chips is a major factor in maintaining the tool and workpiece at an acceptable temperature. If this is achieved, tool life is improved and unwanted changes in the mechanical properties of the workpiece due to temperature increases in the heat affected zone are minimized. Rapid removal of chips from the metalworking zone also reduces scoring of the metalworked surface, promoting good surface texture on the metal worked part. In addition, lubrication is provided by the high volumetric flow rates helping to carry fluid into the tool/workpiece and tool/chip interfaces. However, the flooding method can be quite expensive. Also, much of the metalworking fluid is not consumed during the metalworking process and, consequently, is either wasted or must be recovered and recycled. Recycling, however, can be expensive because the shavings or filings from the metalworking process must be separated from the metalworking fluid. Flooding is further problematic because it can result in potentially harmful worker exposure and waste disposal issues.

Mist application, in which the coolant/lubricant is delivered to the metalworking zone in the form of fine, airborne droplets, is well suited to operations in which the cutting or machining speed is high and the area of cut is low, e.g. end milling. Misting is often used in situations where flooding is impractical and can be advantageous because a lesser amount of liquid is used during the metalworking process which, in turn, means less wasted liquid. The spray method of application is similar to mist application, except the droplets in spray application are much larger than those in the mist method of application. A major disadvantage of each of these application methods is the potential for the exposure of the metalworking operator to harmful amounts of metalworking fluid.

Worker exposure to metalworking fluids can be hazardous to worker health due to inhalation and ingestion of the metalworking fluid, and skin exposure leading to dermatitis. Droplets of metalworking fluid, particularly in misting applications, are readily inhaled by the workers. Eventually, the inhaled metalworking fluid can cause severe respiratory health problems. In order to reduce worker exposure, misting is often conducted in a hooded assembly to ensure proper ventilation and removal of the metalworking fluid droplets. This can result in an increased cost associated with such application.

As mentioned, many currently used organic-based metalworking fluids are classified as hazardous waste materials. For this reason, it is desired to have a non-hazardous metalworking fluid for use in metalworking operations. Because of environmental, health, and cost issues, it is also desired to have a device or method that allows for the application of metalworking fluids to a workpiece whereby a lower fluid volume is required. It is further desired for the metalworking fluid to be non-hazardous to the health of the workers who are metalworking the various workpieces. It is most desired if the metalworking fluid, when applied to the workpiece, is consumed during the metalworking operation so that very little waste of the fluid occurs. It is further desired for the process to be economical.

Prior to the present invention, it was believed difficult to accurately apply a small volume of metalworking fluid to a workpiece while obtaining sufficient cooling and lubrication. Prior to the present invention, if a small amount of liquid was applied, generally, adequate cooling would not result. Also, directing the metalworking fluid to the right location, the interface, was difficult.

A metalworking fluid has now been discovered that is biodegradable, nontoxic, and poses no worker health hazards. A nozzle device for delivering a metalworking fluid to a precise location on a workpiece being metal worked, and a method for delivering such metalworking fluid in an amount sufficient to cool and lubricate the workpiece, while minimizing the amount of oil-containing liquid required has also been discovered.

SUMMARY OF INVENTION

It is an object of the present invention to provide a nozzle device and a metalworking method using the nozzle that precisely delivers a metalworking fluid to the tool/workpiece interface in an amount sufficient to cool and lubricate the workpiece while substantially eliminating the need to recover or dispose of used metalworking fluid. Elimination of waste is advantageous because environmental concerns are reduced, and the metalworking operation becomes more economical. In addition, use of less oil-containing liquid improves economic efficiency of the metalworking operation. It is a further object of the present invention to provide a nozzle device and a metalworking method using the nozzle which reduces worker exposure to metalworking fluids that can be hazardous to worker health due to inhalation and ingestion of the metalworking fluid, and skin exposure leading to dermatitis. It is yet a further object of the invention to provide a biodegradable, non-toxic metalworking fluid for use in the metalworking method of the present invention.

The present invention relates to a device and a method, each directed towards delivering an amount of metalworking fluid to a workpiece and metalworking tool so as to cool and lubricate both the workpiece and the tool, most preferably at the tool/workpiece interface. The device for delivering such fluid is a nozzle having a construction whereby oil-containing liquid and non-flammable gas can be inter-mixed to form a cooling and lubricating metalworking fluid. The nozzle can have a variety of different constructions, as long as there is an opening in the nozzle for receiving an amount of oil-containing liquid and an opening for receiving a pressurized non-flammable gas. Additionally, the nozzle includes a chamber or passageway whereby the oil-containing liquid and non-flammable gas can be mixed to form the metalworking fluid. The nozzle should further include a construction whereby the fluid exits through a narrow passageway to permit accurate placement of the metalworking fluid on a workpiece. When in use, the non-flammable gas and oil-containing liquid are mixed in the nozzle and then projected away from or passed through the nozzle, onto the interface between the workpiece and the metalworking tool member. The non-flammable gas will function to cool the tool and workpiece, and the oil-containing liquid will lubricate the interface therebetween. The non-flammable gas will enter the nozzle under a sufficient pressure to mix with the oil-containing liquid and be projected in a stream away from the nozzle such that the non-flammable gas and oil-containing liquid, i.e. metalworking fluid, hit at a precise point. Such precision is necessary to ensure that comparatively small amounts of oil-containing liquid are used and to ensure that the point where the greatest amount of friction and heat are generated will be cooled and lubricated.

In one embodiment, the nozzle will include at least a two part construction whereby a valve body and a tip are attached to one another. Another member that may be included in the nozzle construction is a hollow needle fitted into the valve body and projecting away from the valve body into a chamber found in the tip. The oil-containing liquid and non-flammable gas will enter the valve body and emanate from sources connected to the nozzle by a conduit or similar structure.

The method includes the steps of mixing non-flammable gas and oil-containing liquid to form the metalworking fluid. Further, the method includes the step of accurately delivering the metalworking fluid onto a precise location so as to cool and lubricate the tool and the workpiece at the tool/workpiece interface and ensure that most of the oil-containing liquid is consumed during the metalworking process.

DETAILED DESCRIPTION OF INVENTION

Figure 1:
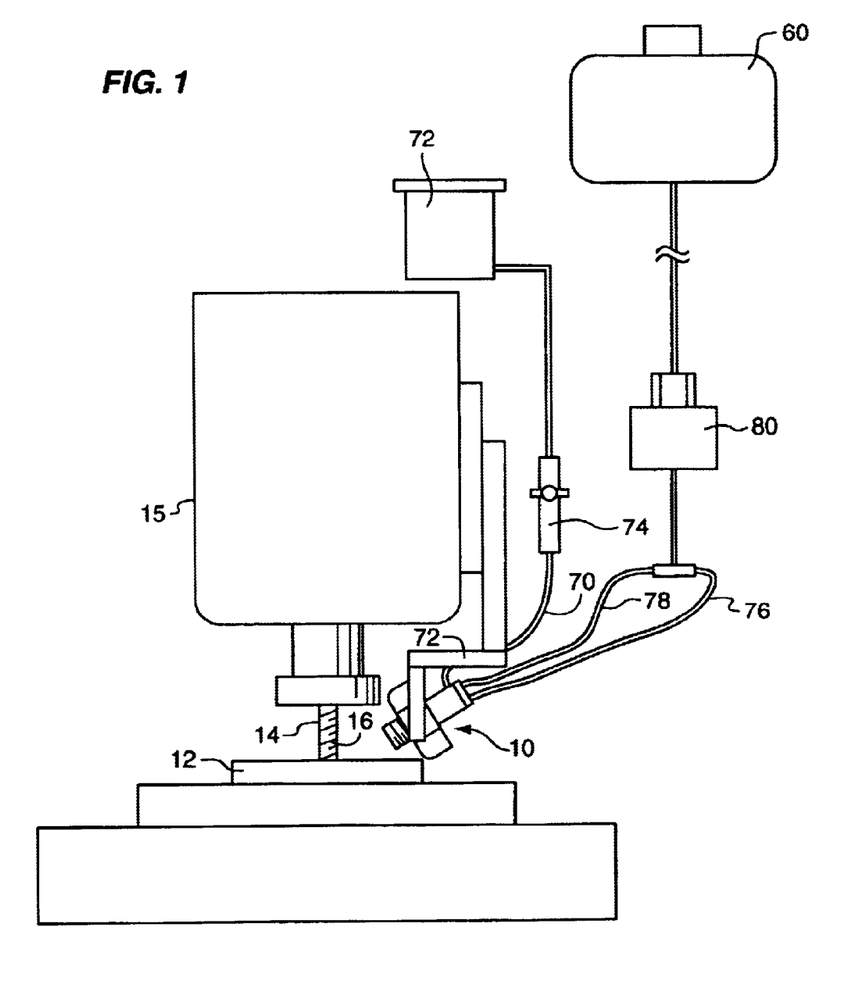
FIG. 1 is a side view of a nozzle device positioned to lubricate the interface between a workpiece and cutting member.

The present invention relates to a nozzle 10 for projecting cutting fluid onto a workpiece 12 and a cutting tool 14 so as to cool and lubricate the metalworking, e.g. machining, process, as shown in FIG. 1. The present invention also relates to a method for cooling and lubricating the tool 14 and workpiece 12 being metalworked, particularly at the interface between the workpiece 12 and the tool 14.

In one embodiment of the present invention, a nozzle for applying a metalworking fluid to a workpiece and metalworking tool during metalworking of the workpiece is provided, wherein the metalworking fluid comprises an amount of at least one oil-containing liquid and an amount of a non-flammable gas, whereby effective cooling and lubrication of the workpiece and the tool occurs. The nozzle comprises a tip, a valve body, and a hollow needle. The tip comprises an inner wall and an outer wall, and a front (or first) end and a back (or second) end. The inner wall has at least a first and second diameter; wherein the inner wall of first diameter forms a chamber and the inner wall of second diameter forms a passage way of a smaller diameter than the chamber, with the passage way connecting the chamber and the front end of the tip, wherein the oil-containing liquid and the non-flammable gas mix in the passage way. The valve body comprises a valve body inner wall and a valve body outer wall, and a front (or first) end and a back (or second) end. The front end of the valve body is attached to the back end of the tip. The valve body inner wall being of varying diameter and having at least a first and second diameter and forming a valve body chamber, with the valve body inner wall first diameter of a larger diameter than the valve body inner wall second diameter. The inner wall has an oil-containing liquid inlet located in the valve body inner wall first diameter, and the valve body has at least one non-flammable gas conduit located between the inner and outer walls extending from the valve body back end to the valve body front end. The hollow needle is fitted into the portion of the valve body chamber formed by the valve body inner wall second diameter, wherein the needle is projecting away from the front end of the valve body into the tip chamber.

Figure 2:
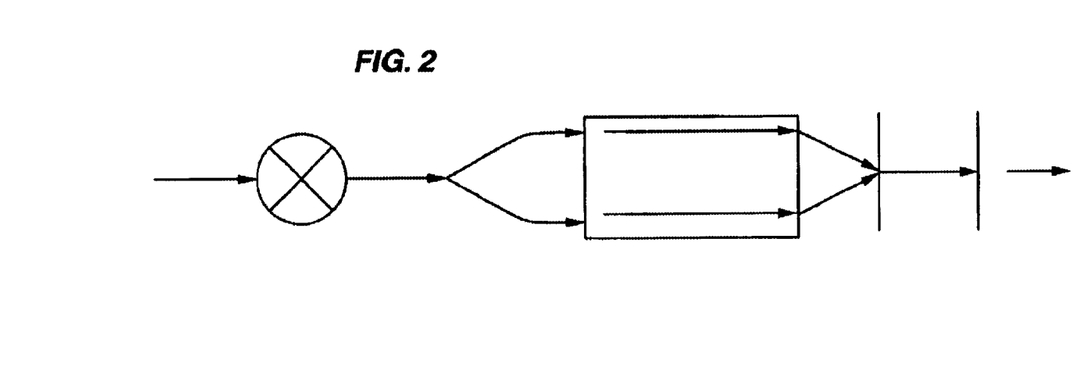
FIG. 2 is a schematic showing how the non-flammable gas is to pass through the nozzle.

The nozzle 10, shown in FIGS. 1, 3, 4, 5, and 6, is constructed so as to accurately project the metalworking fluid onto the place where the workpiece 12 is being metalworked by the tool 14, with the fluid comprised of oil-containing liquid and non-flammable gas. The nozzle 10 has a construction that causes the non-flammable gas and oil-containing liquid to mix together and form a metalworking fluid that cools, lubricates, and can be adequately directed to the interface where the tool metalworks, e.g. machines or cuts, the workpiece. The mixing of oil-containing liquid and non-flammable gas is schematically shown in FIG. 2. A particularly important function of the metalworking fluid of the invention in metalworking operations is the function of cooling so as to maintain lower temperature of the tool 14 as well as the workpiece 12. Such control aids in minimizing tool wear and distortion of the workpiece. Another function of the metalworking fluid of the invention is lubrication which reduces friction between the tool and chips produced during the metalworking operation as well as reduction of the friction between the tool and the workpiece. Comparatively small amounts of oil-containing liquid will be used during the metalworking process, with most of the oil-containing liquid consumed during the metalworking process.

The workpiece 12 that is to be metalworked can be of a variety of shapes, sizes, and dimensions, with the dimensions determined by the final use intended for the workpiece. The nozzle and method of the present invention using the metalworking fluid of the invention is useful with a variety of metalworking operations. Suitable metalworking operations include cutting, threading, grinding, broaching, tapping, planing, gear shaping, reaming, deep hole drilling/gundrilling, drilling, boring, hobbing, milling, turning, sawing, shaping, honing, and the like. Additionally, the workpiece 12 can be made from a variety of different types of metals and compositions, with the material which is selected determined by the final use of the workpiece. In particular, both ferrous and non-ferrous metals can be worked using the metalworking fluid, nozzle and method of the present invention. Examples of ferrous metals include, but are not limited to, iron, steel (carbon steel and low alloy carbon steel), and stainless steel. Examples of non-ferrous metals include, but are not limited to, copper, brass, bronze, aluminum, and magnesium. Such metals are safely worked with lubricity and cooling supplied by the metalworking fluids of the invention. Aluminum or steel are typically used to make the workpiece 12, with the workpiece preferably being flat so that it can be metalworked into a tool, part or similar member. The workpiece is the raw material that will be metalworked, e.g. cut and/or machined, to form a part or tool.

The metalworking fluid for use in the present invention comprises an amount of at least one oil-containing liquid and an amount of a non-flammable gas. The metalworking fluid is produced by mixing at least one oil-containing liquid and a non-flammable gas in the nozzle of the present invention. While not limited to, a typical ratio (on a mass basis) of non-flammable gas to oil-containing liquid is about 2630:1. On a volume basis, this ratio is about $1.96 \times 10^6:1$. The metalworking fluid is a fine spray and, while not limited to, a typical mean diameter of the oil-containing liquid droplets is about 40 to about 60 $\mu$m.

The oil-containing liquid is selected from natural lubricating oils, synthetic lubricating oils, vegetable-based oils or mixtures thereof. The viscosity of the oil-containing liquid should range from about $3 \times 10^2$ to about $6 \times 10^{-2}$ Newton-seconds/m$^2$.

Suitable natural lubricating oils include petroleum oils, mineral oils, and oils derived from coal or shale which are refined by typical procedures including fractionating distillation, solvent extraction, dewaxing and hydrofinishing.

Suitable synthetic oils include hydrocarbon oils and halo-substituted hydrocarbon oils such as polymerized and inter-polymerized olefins, alkylbenzenes, polyphenyls, alkylated diphenyl ethers, alkylated diphenyl ethers, alkylated diphenyl sulfides, as well as their derivatives, analogs, and homologs thereof, and the like. Synthetic lubricating oils also include alkylene oxide polymers, interpolymers, copolymers and derivatives thereof wherein the terminal hydroxyl groups have been modified by esterification, etherification, etc. Another suitable class of synthetic lubricating oils comprises the esters of dicarboxylic acids with a variety of alcohols. Esters useful as synthetic oils also include those made from $C_5$ to $C_{12}$ monocarboxylic acids and polyols and polyol ethers.

Silicon-based oils (such as the polyalkyl-, polyaryl-, polyalkoxy-, or polyaryloxy-siloxane oils and silicate oils) comprise another useful class of synthetic lubricating oils. Other synthetic lubricating oils include liquid esters of phosphorus-containing acids, polymeric tetrahydrofurans, polyalphaolefins, and the like.

Suitable vegetable-based oils for use in the present invention include, but are not limited to, soybean oil, safflower oil, linseed oil, corn oil, sunflower oil, canola oil, cottonseed oil, rapeseed oil, tung oil, fish oil, peanut oil, high oleic safflower oil, high oleic soybean oil, high oleic peanut oil, high oleic sunflower oil, high erucic rapeseed oil, or a blend of any of these oils.

The oil-containing liquid selected for use with the nozzle is preferably a non-toxic lubricating liquid. While any non-toxic lubrication liquids may be used, it is preferred that the oil-containing liquid is a vegetable-based oil suitable for use in the metalworking process of the present invention. The currently preferred vegetable-based oil is soybean oil.

The vegetable-based oils have substantial benefits over petroleum-based oils. These benefits include: (1) the vegetable-based oils are renewable resources from the U.S. agricultural market; (2) the vegetable-based oils are completely biodegradable due to their ability to cleave at the ester linkage and oxidize near the carbon—carbon double bond; (3) the vegetable-based oils are non-toxic and ingestible (this benefit coupled with the biodegradability, means that the fluids are a less significant environmental hazard from uncontrolled spills); and (4) the vegetable-based oils are safe in that they possess very high flash points, on the average, more than 290° C. (570° F.) reducing the fire hazard.

The non-flammable gas is selected from air, inert gases (e.g. nitrogen, argon, neon, etc.), carbon dioxide, or mixtures thereof. The preferred non-flammable gas for use in the invention is air due to its relatively low cost and availability. The non-flammable gas used in the metalworking process of the present invention is a pressurized gas. The pressure of the non-flammable gas charged to the nozzle device of the present invention is controlled using a pressure control valve or pressure regulator, and is determined by the pressure necessary to achieve the proper flow pattern for the metalworking fluid. Typically the pressure of the non-flammable gas charged to the nozzle device is about 8 psig to about 30 psig, preferably about 12 psig to about 20 psig. The pressure of the non-flammable gas inside the channels in the body typically range from about 2.3 to about 2.4 psig. The typical flow rate of the non-flammable gas is a flow rate sufficient to begin to enter the range of the compressibility for air, e.g. from about Mach 0.3 to Mach 0.7.

The metalworking fluid of the present invention optionally contains conventional additives, such as antioxidants, extreme pressure additives, oiliness improvers, defoaming agents, detergent dispersants, and viscosity modifiers, that are chemically compatible with the oil-containing liquid. Such additives can be added according to necessity in conventional amounts that are well known to those of ordinary skill in the art.

Examples of antioxidants for use in the present invention include phenol antioxidants, such as 2,6-di-t-butylphenol, 2,6-di-t-butyl-4-methylphenol, and 4,4'-methylenebis(2,6-di-t-butylphenol); amine-based antioxidants, such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthylamine, and alkylphenyl-2-naphthylamine; sulfur-based antioxidants, such as alkyl disulfides, thiodipropionic acid esters, and benzothiazoles; and zinc dialkyl dithiophosphate and zinc diaryl dithiophosphate. When used, the amount of antioxidant added is about 0.05 to about 2.0% by weight of the oil-containing liquid of the present invention.

Examples of the usable extreme-pressure additives and oiliness improvers are zinc compounds, such as zinc dialkyl dithiophosphates and zinc diaryl dithiophosphates; sulfur compounds, such as thiodipropionic acid esters, dialkyl sulfides, dibenzyl sulfide, dialkyl polysulfides, alkyl mercaptans, dibenzothiophene, and 2,2'-dithiobis(benzothiazole); phosphorus compounds, such as triaryl phosphates, triaryl phosphites, trialkyl phosphites, and trialkyl phosphates; chlorine compounds, such as chlorinated paraffins; molybdenum compounds, such as molybdenum dithiocarbamate, molybdenum dithiophosphate, and molybdenum disulfide; fluorine compounds, such as perfluoroalkyl polyethers, trifluorochloro ethylene polymers, graphitefluoride; silica compounds, such as fatty acid-modified silicones; and graphites. When used, the amount of extreme-pressure additive and oiliness improver added is about 0.05 to about 10% by weight of the oil-containing liquid of the present invention.

Examples of usable defoaming agents are silicone oils, such as dimethylpolysiloxane; and organosilicates, such as diethyl silicate. When used, the amount of defoaming agent added is about 0.0005 to about 1% by weight of the oil-containing liquid of the present invention.

Examples of detergent dispersants for use in the present invention include sulfonates, phenates, salicylates, phosphonates, polybutenyl succinimides, and polybutenyl succinic acid esters. When used, the amount of detergent dispersant added is about 0.05 to about 10% by weight of the oil-containing liquid of the present invention.

Examples of viscosity modifiers for use in the present invention include methylsoyate, and D-limonene, with methylsoyate being currently preferred. When used, the amount of viscosity modifier added is about 5 to about 25% by weight of the oil-containing liquid of the present invention.

Any of a variety of tools 14 can be used to machine or cut the workpiece 12. In typical cutting operations, for example, a cutting tool 14 is used that has a blade 16 that rotates and cuts the workpiece. It is preferred if the position of the cutting tool is fixed or stationary so that the nozzle can be fixedly attached. Other cutting devices of different sizes, dimensions, and designs may be used as long as the present nozzle 10 can be used to project fluid to cool and lubricate the workpiece and the cutting tool at the tool/workpiece interface. When the workpiece is being cut, it will preferably move relative to the tool so that the nozzle does not have to be adjusted. The tool blade, however, can move as long as the nozzle is designed to move relative to the blade to ensure adequate cooling and lubrication.

The nozzle 10 can have any of a variety of constructions as long as the oil-containing liquid and non-flammable gas are adequately mixed and can be projected such that the tool 14 and workpiece 12 are cooled and lubricated at the tool/workpiece interface. Further, the nozzle 10 must be of a construction that allows for the entry of non-flammable gas and oil-containing liquid into the nozzle 10 device prior to projecting the fluid away from the nozzle. This is conceptually illustrated in FIG. 2. Thus, the nozzle 10 should have a mixing chamber, non-flammable gas entry port, oil-containing liquid entry port, and exit port. It is most preferred if the nozzle 10 is comprised of a tip 18, a valve body 20, and a hollow needle 22.

Figure 3:
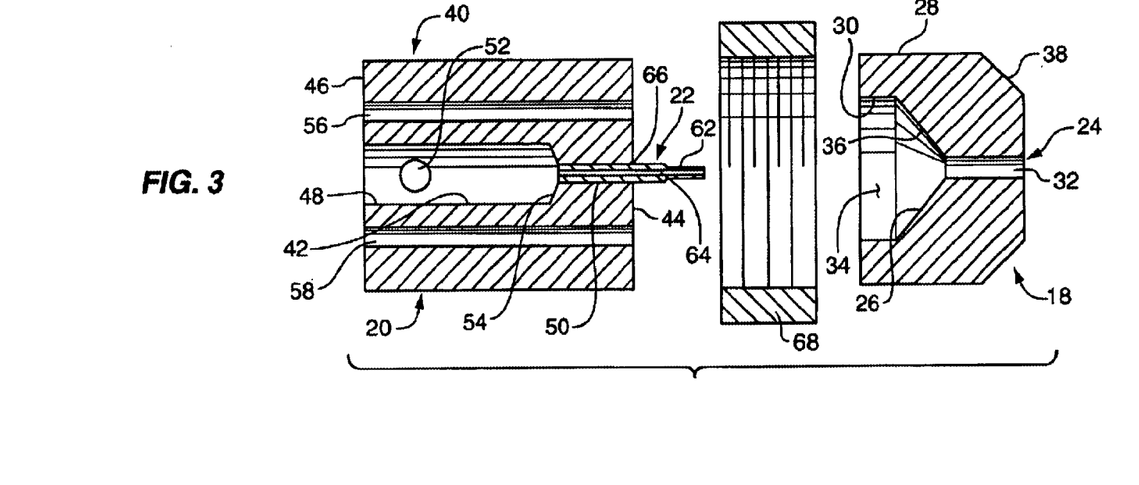
FIG. 3 is a side separated view of the valve body, nut, and tip prior to attachment.

The tip 18, shown in FIG. 3, is the member where the oil-containing liquid and non-flammable gas intermix. The tip 18 will also contain the exit orifice 24, which is a passageway, preferably cylindrical, where the oil-containing liquid and non-flammable gas mix and then exit the tip. The tip 18 has an inner wall 26 and an outer wall 28, with the inner wall having a first inner wall portion 30 of a first diameter and a second inner wall portion 32 of a second diameter. The first portion or diameter 30 will form a chamber 34 where non-flammable gas can enter into the tip 18. The first portion 30 will have a greater diameter than the second portion 32. The second portion inner wall 32 will be where the oil-containing liquid and non-flammable gas mix to form the metalworking fluid. The second portion inner wall 32 should be of a sufficient length to ensure adequate mixing and formation of the metalworking fluid. Further, the inner wall at the second portion 32 should be of a smaller diameter so that the non-flammable gas and oil-containing liquid are forced to pass through and to be adequately projected onto the surface of the workpiece 12 and tool 14. Preferably, the inner wall 26 is beveled between the first and second portions to form a beveled inner wall 36. It is also preferred if the inner wall is annular, regardless of the diameter. The tip 18 is also shown from the back end in FIG. 6. This view more clearly illustrates the different diameters of the inner wall 26.

The outer wall 28 of the tip 18 can be of a variety of sizes and dimensions, with it preferred for the outer wall to be annular. It is preferred if part of the outer wall of the tip closest to the workpiece is beveled so that the diameter of the outer wall decreases from the back to the front. The beveled outer wall 38 is preferred. The tip can be made of a variety of materials as long as it is suitable for use in a metalworking operation and can withstand repeated usage.

The second portion inner wall 32 will form what is known as the mixture orifice 24. Broadly, the second portion 32 of the inner wall will have a diameter ranging from about 0.1 to about 0.14 inches, preferably about 0.116 inches to about 0.128 inches. The first portion 30 of the inner wall broadly has a diameter ranging from about 0.781 inches to about 0.844 inches, preferably about 0.797 inches to about 0.828 inches, and most preferably about 0.812 inches. Also, the inner wall should be beveled at an angle of about 100° to about 130°, preferably about 118° between the first portion and second portion. The width of the tip 18 is not critical, but typically is at least about 0.9 inches. The length of the first inner wall portion 30 should be sufficient so as to allow the non-flammable gas to enter and to be projected into the mixture orifice. Generally, the first inner wall portion has a length equal to about 0.2 inches to about 0.3 inches, preferably about 0.25 inches. The beveled portion of the inner wall is about 0.1 inches to about 0.2 inches, preferably about 0.16 inches long. These dimensions have been observed to result in the best mixing and projection combination; however, other dimensions can readily be used as will be readily apparent to one of ordinary skill in the art.

Attached to the tip 18 is a valve body 20, shown in FIG. 3. The valve body 20 is shaped and dimensioned to receive the tip 18 and be attached thereto. The valve body 20 is essentially a conduit which transfers the oil-containing liquid and non-flammable gas from their respective sources to the tip 18. The valve body 20 will have an outer wall 40 and an inner wall 42, a front end 44 and a back end 46. The inner wall 42 will be of a varying diameter and have at least a first wall 48 and second wall 50, each of a different diameter. The first wall 48 of the valve body inner wall has a greater diameter than the second wall 50 of the valve body inner wall. Oil-containing liquid will enter the valve body 20 through an oil-containing liquid inlet 52 located in the inner wall 42, more particularly, the first wall 48. The valve body inner wall will also preferably be beveled between the first wall 48 and second wall 50 to form valve beveled wall 54. The inner wall 42 will have an annular construction. The valve body outer wall 40 will also preferably have an annular construction; however, any construction may be used as long as the tip 18 and the valve body 20 can be fitted together, and non-flammable gas and oil-containing liquid can be transferred to the tip. Broadly, the valve body 20 is about 1.1 to about 1.4 inches long and about 1.1 to about 1.4 inches wide, preferably about 1.25 inches long and about 1.25 inches wide.

Located between the inner wall 42 and the outer wall 40 of the valve body 20 will be at least one non-flammable gas conduit 56. More preferably, there are at least two non-flammable gas conduits 56 and 58 located between the valve body inner and outer walls. The non-flammable gas conduits 56 and 58 will receive non-flammable gas from a source 60 attached to the back end of the valve body 46 located opposite the tip 18. Non-flammable gas will pass from the back end 46 of the valve body 20 through to the opposite or front end 44 into the tip 18. The non-flammable gas conduits 56 and 58 will extend the length of the valve body, and be of a diameter sufficient to achieve the desired non-flammable gas flow rate with an acceptable pressure drop across the length of the conduit such that adequate mixing of the non-flammable gas and the oil-containing liquid is achieved. Preferably, the non-flammable gas conduit(s), 56 and 58, will be of a diameter of about 0.1 to about 0.135 inches, more preferably about 0.125 inches. The valve body 20 can be made from a variety of materials, with metal being the preferred material for use.

A hollow needle 22 is fitted into the portion of the valve body chamber formed by the second wall 50 of the inner wall of the valve body 20. The needle 22 is designed to allow the passage of the oil from the valve body 20 into the tip 18, with the end of the needle 62 opposite the valve body, located proximal to the mixture orifice 24 when the valve body and tip are fitted together. Preferably, the needle 22 is press fitted into the inner wall 50 of the valve body 20. The needle 22 will have an inner wall 64 and an outer wall 66, with the diameter of the inner wall sufficient to achieve the desired oil-containing liquid flow rate such that adequate mixing of the non-flammable gas and the oil-containing liquid is achieved. Preferably, the inner wall diameter is about 0.02 to about 0.05 inches, more preferably about 0.038 inches. These dimensions, of course, can be varied dependent upon the particular metalworking operation and the desired metalworking fluid spray pattern and thickness. The valve body 20 is also shown from the back end in FIG. 5. This view more clearly illustrates the different diameters of the inner wall 42 and hollow needle 22.

Figure 4:
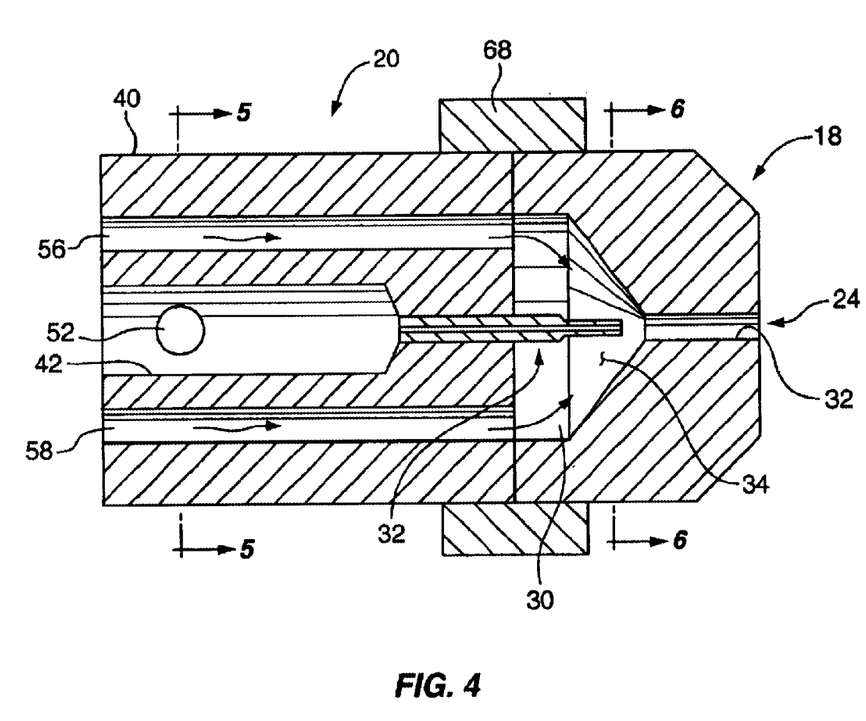
FIG. 4 is a side view of the nozzle, with the valve body, nut, and tip attached.
Figure 5:
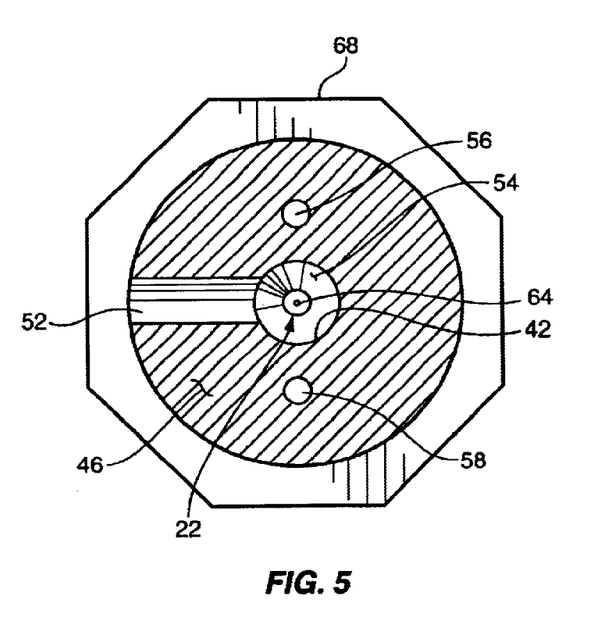
FIG. 5 is a back end view of the valve body.
Figure 6:
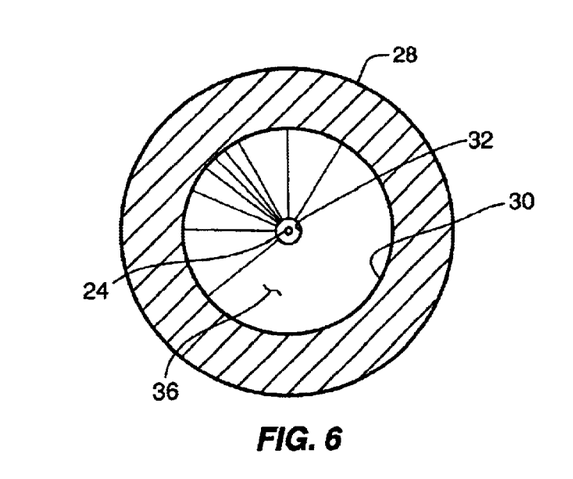
FIG. 6 is a back end view of the tip.

It is preferred if the tip 18 and the valve body 20 are attached to one another by a nut member 68. Preferably, the nut 68 is threaded and both the tip and valve body are correspondingly threaded on the outer wall of each, so that the tip and valve body can be fastened to one another by the nut. Other devices or members, however, can be used to attach the valve body and tip. The assembled nozzle is best shown in FIG. 4. The tip and the valve body are shown attached to one another by the nut.

Attached to the valve body 20 will be an oil-containing liquid line 70. The oil-containing liquid line 70 is affixed to the valve body 20 at the oil-containing liquid inlet 52. Connected on an end opposite the inlet 52, the oil-containing liquid line 70 will be attached to an oil-containing liquid reservoir 72. The oil-containing liquid reservoir 72 is for storing oil-containing liquid prior to use in metalworking operations. The line 70 will carry oil-containing liquid from the reservoir to the nozzle 10. It is preferred if a metering valve 74 is located on the line between the reservoir 72 and the nozzle 10, with the metering valve 74 designed as a flow control valve to control the flow of oil-containing liquid into the nozzle.

Attached to the non-flammable gas conduits 56 and 58 on the back end of the valve body 20 will be at least one supply line 76, and preferably a second supply line 78. The supply lines carry non-flammable gas under pressure from a compressed non-flammable gas source 60 into the nozzle 10. There will be a supply line (76 and 78) for every non-flammable gas conduit (56 and 58). Alternatively, a single supply line could be attached to a first end of a non-flammable gas supply manifold, and a plurality of lines exiting the manifold to supply non-flammable gas to each non-flammable gas conduit on the back end of the valve body. The compressed non-flammable gas source 60 can be any of a variety of devices or members that produce or supply pressurized non-flammable gas that can be used in the nozzle 10. A metering valve 80 can be located between the compressed non-flammable gas source 60 and the nozzle 10, with the metering valve 80, e.g. pressure regulator or pressure control valve, designed to control the pressure and flow rate of the non-flammable gas.

The nozzle will be held by an aiming mechanism 82 attached to the metalworking device 15, whereby the aiming mechanism is designed to position the nozzle 10 such that the fluid is projected into the desired position on the workpiece 12 and tool 14. The nozzle 10 is typically held at a downward sloping angle to facilitate the delivery of metalworking fluid to the workpiece/tool interface.

When in use, the nozzle will be aimed at the interface between the metalworking tool and the workpiece so that metalworking fluid is projected precisely onto the point where the tool cuts or machines the workpiece. The metalworking fluid will be delivered, e.g. projected or provided, such that the oil-containing liquid is applied at a location where lubrication is required and non-flammable gas flow is sufficient to ensure cooling.

In another embodiment of the present invention, a method for applying a metalworking fluid during metalworking of a workpiece using a metalworking tool is provided wherein the metalworking fluid is applied using the nozzle of the present invention.

Such a method for applying a metalworking fluid during metalworking of a workpiece using a metalworking tool comprises (a) delivering an oil-containing liquid to an orifice of a nozzle; (b) mixing the oil-containing liquid with a pressurized non-flammable gas in the orifice to produce a metalworking fluid, wherein the non-flammable gas is at a sufficient pressure to produce adequate mixing of the oil-containing liquid and the non-flammable gas, and the orifice is of a diameter effective to produce a fine spray of said metalworking fluid; and, (c) contacting the metalworking fluid with the workpiece and the metalworking tool at the interface of the workpiece and tool.

In another embodiment, a method for metalworking a workpiece using a metalworking tool is provided comprising (a) mixing at least one oil-containing liquid with a pressurized non-flammable gas in a nozzle orifice to produce a metalworking fluid, wherein the non-flammable gas is at a sufficient pressure to produce adequate mixing of the oil-containing liquid and the non-flammable gas, and the orifice is of a diameter effective to produce a fine spray of the metalworking fluid; (b) contacting the metalworking fluid with the workpiece and the metalworking tool at the interface of the workpiece and tool; and (c) metalworking the workpiece using the tool.

In yet another embodiment of the present invention, a metalworking fluid composition comprising a mixture of a vegetable-based oil and a pressurized non-flammable gas is provided, wherein the metalworking fluid is a fine spray.

Thus, there has been shown and described a novel nozzle and method associated with a nozzle for lubricating metals being metalworked, which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A nozzle for applying a metalworking fluid to a workpiece and metalworking tool during metalworking of the workpiece, said metalworking fluid comprising an amount of at least one oil-containing liquid and an amount of a non-flammable gas, whereby effective cooling and lubrication of the workpiece and the tool occurs, said nozzle comprising:

(a) a tip having an inner wall and an outer wall, and a front end and a back end, said inner wall of at least a first and second diameter; wherein said inner wall of first diameter forms a chamber and said inner wall of second diameter forms a passage way of a smaller diameter than said chamber connecting said chamber and the front end of said tip, wherein said oil-containing liquid and said non-flammable gas mix in said passage way;

(b) a valve body having a valve body inner wall and a valve body outer wall, and a front end and a back end, the front end of said valve body being attached to the back end of said tip; said valve body inner wall being of varying diameter and having at least a first and second diameter and forming a valve body chamber, with said valve body inner wall first diameter of a larger diameter than said valve body inner wall second diameter, said inner wall having an oil-containing liquid inlet located in said valve body inner wall first diameter, and said valve body having at least one non-flammable gas conduit located between said inner and outer walls extending from said valve body back end to said valve body front end; and, (c) a hollow needle fitted into the portion of said valve body chamber formed by said valve body inner wall second diameter, said needle projecting away from the front end of said valve body into said tip chamber.

2. The nozzle of claim 1 wherein said tip inner wall is beveled between said first and second diameters.

3. The nozzle of claim 1 wherein said tip and valve body are attached to one another by a nut member.

4. The nozzle of claim 1 wherein said hollow needle has an inner wall having a diameter of about 0.02 to about 0.05 inches.

5. The nozzle of claim 1 wherein said second diameter of said tip is about 0.1 to about 0.14 inches.

6. The nozzle of claim 1 further comprising a non-flammable gas source designed to provide pressurized non-flammable gas to said nozzle, with non-flammable gas pressure controlled by a pressure control valve, wherein at least one tubular member is affixed on one end to said pressure control valve and on an opposite end to said valve body, with the non-flammable gas entering said valve body via said at least one non-flammable gas conduit.

7. The nozzle of claim 1 further comprising an oil-containing liquid reservoir for holding oil-containing liquid for use in the metalworking process, an oil-containing liquid line connecting said reservoir to said valve body, with said oil-containing liquid line attached to said oil-containing liquid inlet, said oil-containing liquid line further including a valve located between said reservoir and said valve body for controlling oil-containing liquid flow.

8. The nozzle of claim 1 wherein non-flammable gas is at a pressure sufficient to effectively mix said oil-containing liquid and said non-flammable gas and project said metalworking fluid onto the tool to cool and lubricate the tool, with said metalworking fluid velocity being subsonic.

9. The nozzle of claim 1 wherein said valve body has two non-flammable gas conduits.

10. The nozzle of claim 1 wherein said oil-containing liquid is a vegetable-based oil.

11. The nozzle of claim 10 wherein said vegetable-based oil is soybean oil.

12. The nozzle of claim 1 wherein said non-flammable gas is air.

13. The nozzle of claim 1 wherein said tip is located within about one inch of the workpiece.

14. A method for applying a metalworking fluid during metalworking of a workpiece using a metalworking tool comprising:

(a) conveying an oil-containing liquid through a protrusion into a mixing chamber by discharge at a forward position of the protrusion towards an orifice of a nozzle;

(b) delivering a pressurized non-flammable gas to said mixing chamber at a position rearward of the forward position of the protrusion to mix said oil-containing liquid with the pressurized non-flammable gas and produce a metalworking fluid, wherein said non-flammable gas is at a sufficient pressure to produce adequate mixing of said oil-containing liquid and said non-flammable gas, and said orifice is of a diameter effective to produce a fine spray of said metalworking fluid; and, (c) contacting said metalworking fluid with said workpiece and said metalworking tool at the interface of said workpiece and said tool.

15. The method of claim 14 wherein the step of delivering includes flowing the non-flammable gas into the mixing chamber at a velocity ranging from Mach 0.3 to Mach 0.7.

16. The method of claim 14 wherein said non-flammable gas is air.

17. The method of claim 14 wherein said oil-containing liquid is a vegetable-based oil.

18. The method of claim 17 wherein said vegetable-based oil is soybean oil.

19. The method of claim 14 wherein the diameter of said orifice is about 0.1 to about 0.14 inches.

20. A method for applying a metalworking fluid during metalworking of a workpiece using a metalworking tool using the nozzle of claim 1.

21. A method for metalworking a workpiece using a metalworking tool comprising:
(a) mixing at least one oil-containing liquid with a pressurized non-flammable gas in a nozzle orifice to produce a metalworking fluid, wherein said non-flammable gas is at a sufficient pressure to produce adequate mixing of said oil-containing liquid and said non-flammable gas at a velocity ranging from Mach 0.3 to Mach 0.7, and said orifice is of a diameter effective to produce a fine spray of said metalworking fluid;
(b) contacting said metalworking fluid with said workpiece and said metalworking tool at the interface of said workpiece and said tool; and
(c) metalworking said workpiece using said tool.

22. The method of claim 21 wherein the pressure of said non-flammable gas is about 12 to about 20 psig.

23. The method of claim 21 wherein said non-flammable gas is air.

24. The method of claim 21 wherein said oil-containing liquid is a vegetable-based oil.

25. The method of claim 24 wherein said vegetable-based oil is soybean oil.

26. The method of claim 21 wherein the diameter of said orifice is about 0.1 to about 0.14 inches.

27. A metalworking fluid composition comprising a mixture of a vegetable-based oil, a viscosity modifier, and a pressurized non-flammable gas, wherein said metalworking fluid is a fine spray.

28. The composition of claim 27 wherein said vegetable-based oil is soybean oil.

29. The composition of claim 28 wherein said non-flammable gas is air.

30. The composition of claim 29 wherein the mean droplet diameter of said soybean oil is about 40 to about 60 $\mu$m.

31. The composition of claim 27 wherein said viscosity modifier is methyl soyate.

\* \* \* \* \*

UNITED STATES PATENT AND TRADEMARK OFFICE
CERTIFICATE OF CORRECTION

PATENT NO. : 6,746,185 B2
DATED : June 8, 2004
INVENTOR(S) : Kevin Hubbard et al.

It is certified that error appears in the above-identified patent and that said Letters Patent is hereby corrected as shown below:

Column 5,
Line 62, should read as follows:
-- 2630:1. On a volume basis, this ratio is about $1.96 \times 10^6$:1. --

Column 6,
Line 2, should read as follows:
-- should range from about $3 \times 10^{-2}$ to about $6 \times 10^{-2}$ Newton- --

Signed and Sealed this

Twenty-eighth Day of December, 2004

JON W. DUDAS
*Director of the United States Patent and Trademark Office*